Patented Oct. 24, 1950

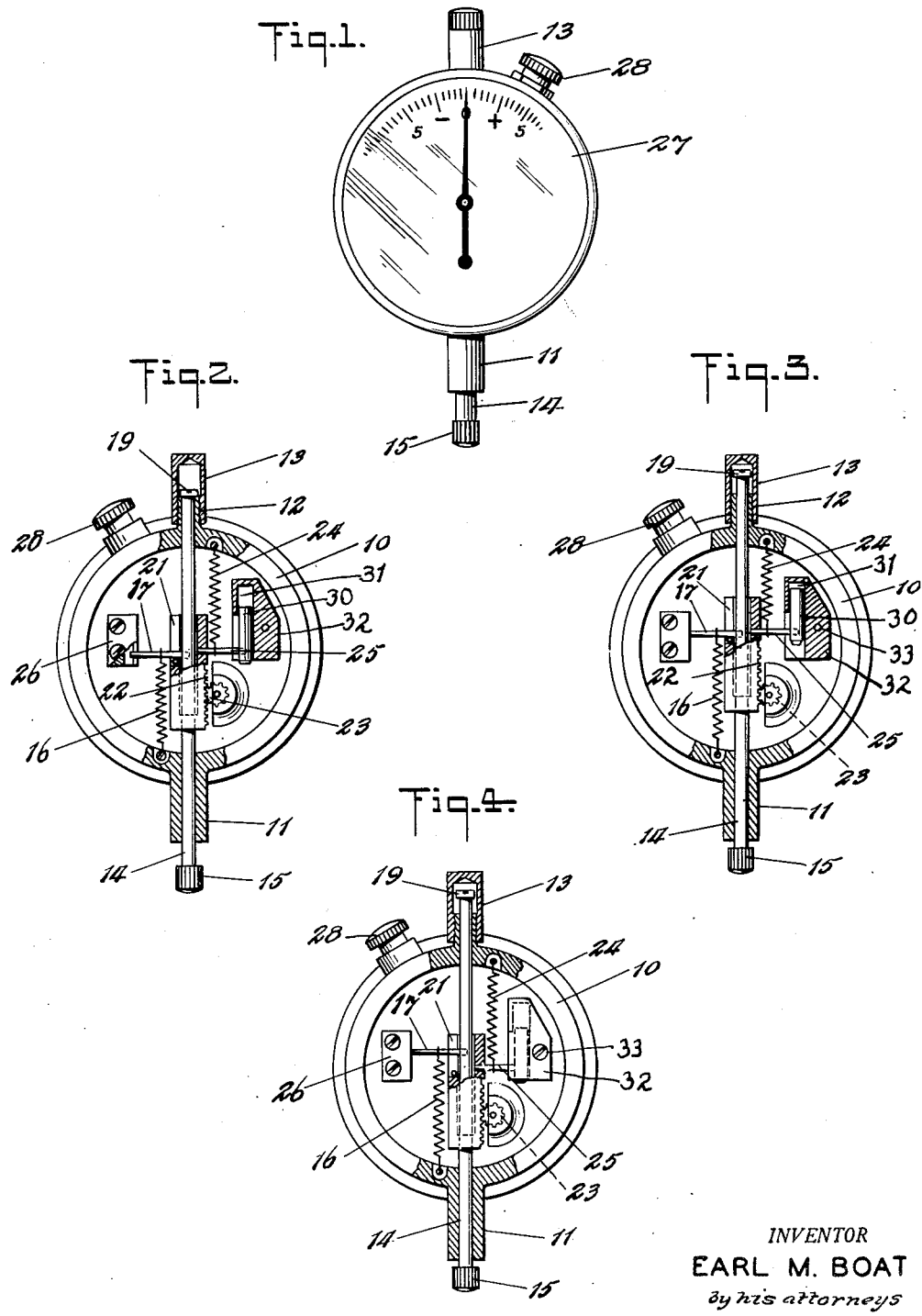

2,527,173

UNITED STATES PATENT OFFICE 2,527,173

SHOCKPROOF DIAL INDICATOR

Earl M. Boat, Poughkeepsie, N. Y., assignor to Standard Gage Company, Inc., Poughkeepsie, N. Y., a corporation of New York Application May 27, 1948, Serial No. 29,550

3 Claims. (Cl. 33—172)

The present invention relates to a gear driven dial indicator and particularly to a construction whereby the dial indicator mechanism is protected against damage or shock thus eliminating wear and increasing the life of the instrument.

The construction of the instrument is similar to and an improvement upon that shown in Emery Patent No. 2,178,745, issued November 7, 1939. The instrument of that patent has been widely used and has proven extremely effective in most instances. However, under very severe service a sufficient shock may be transmitted to the gear train to cause damage to the gears. It is for the purpose of eliminating the possibility of damage under these extreme shock conditions that the present invention has been made.

In the present invention I utilize a damping means for the movement of the rack sleeve of the instrument which assures that the spring cooperating with that sleeve cannot of itself produce sufficient shock to cause damage to the gear train of the instrument.

It is, therefore, an object of the invention to provide a damping means to prevent rapid movement of the rack sleeve of a shockproof dial indicator to prevent any small amount of shock which may be transmitted to the instrument from causing damage either to the rack or to any of the gears of the train.

It is another object of the invention to provide such a damping means which is readily applied to the mechanism of the dial indicator of the Emery patent hereinabove.

It is a further object of the invention to provide a damping means which is simple and inexpensive to construct and which is not liable to failure or maintenance in operation.

Other objects and features of the invention will appear when the following description is considered in connection with the annexed drawings in which—

Figure 1 is a front elevation of a dial indicator having my invention applied thereto;

Figure 2 is a rear view of the dial indicator with the rear cover removed, this view being partly in section in order to clearly illustrate the construction. In Figure 2 the parts are in normal or unoperated position;

Figure 3 is a view similar to Figure 2 but showing the parts in position after operation; and Figure 4 is a view similar to Figure 2 but showing the parts in the position which they assume when the operating plunger has been moved but the rack sleeve has not yet followed into its new position.

Referring now to the drawings, the indicator is composed of a body ring 10 formed with two vertically aligned diametrically opposite tubular bearing stems 11 and 12. The upper stem 12 is provided with a cap 13 which closes the outer end thereof sealing it against entrance of dirt, grease, etc. Slidably mounted in the two bearings 11 and 12 is a contact plunger 14 which is provided at its lower end with a contact member 15 which may be provided with a hardened steel contact plug or with a diamond contact plug in the usual manner. Contact plunger 14 is urged downwardly by spring 16 which extends from a pin in the lower circumference of the ring 10 to a pin 17 fixed to the plunger.

The upper limit of movement of the contact plunger 14 is determined by the upper surface of the contact button 15 which engages with the lower end of the housing extension 11. The lower limit of movement of the contact plunger 14 is determined in accordance with the adjustment of a screw 19 which is threaded into the upper end of the plunger 14 and adapted to seat against the end of the tubular portion 12.

Slidably mounted on the plunger 14 is a rack block 21 having teeth 22 cut into its righthand face. The teeth 22 cooperate with mating teeth on the pinion 23 of the usual indicator gear train. The internal bore of the block 21 is increased intermediate its ends in order to reduce the frictional engagement between the plunger 14 and the block while at the same time providing an accurate bearing surface.

Rack block 21 is constantly urged upward by means of a light spring 24, one end of which is fixed in the upper circumference of the ring 10 and the other end of which is fixed to a pin 25 fastened in the rack block 21. The pin 17 previously mentioned extends through a slot in the rack block 21 and is guided at its outer extremity in a slot in the guide block 26, as is clearly shown in Figure 2.

The device thus far described is essentially the same as that in the above mentioned Emery patent. With this device the contact plunger 14 when subjected to a shock blow, that is when moved with great rapidity, moves away from the rack block 21 which thereafter is caused by the tension of the spring 24 to move into a position so that the base of the slot in the block or a transverse pin mounted adjacent the base of the slot comes into contact with the guide pin 17. However, under extremely hard service where the indicator is constantly subjected to shocks, the tension of spring 24, though very light, is sometimes sufficient to cause the rack sleeve to come into its final measuring position against the guide pin 17 so rapidly as to cause injury either to the rack teeth or to the teeth of some of the gears in the gear train.

By my present invention I have eliminated this possibility. The means for accomplishing this result comprise a block 32 which is mounted to the right of the contact plunger, as seen in Figures 2, 3 and 4. This block is provided with a cylindrical bore 31 in which a plunger or piston 30 fits somewhat loosely. The piston 30 is engaged by the outer extremity of the pin 25 between which pin and a pin in the casing 10 the spring 24 is stretched. As indicated in the drawing, the pin 25 extends through a slot in the wall of the cylindrical bore 31 in the block 32.

In use the indicator is fixed in a position such that the gaging standard raises the indicating plunger 14 to a position intermediate its limits of movement and the dial 27 (Figure 1) is then rotated so that the zero point thereon coincides with the position of the indicating pointer, the clamp screw 28 being then tightened to retain the dial 27 in the adjusted position. Having thus set the instrument, articles to be compared with the standard are successively placed against the contact plunger. As this occurs the plunger is caused to rise to corresponding measuring position and, due to the tension exerted by the spring 24, the rack block 21 follows the movement of the plunger. When the plunger movement is relatively slow the rack block 21 follows it, the lower end of the slot in the block remaining against the pin 17.

As the block rises the teeth thereof cause rotation of the pinion 23 which results in movement of the indicator pointer to give proper indication of the dimension of the particular piece measured as compared with the standard. The positions of the parts after such normal operation are shown in Figure 3.

If the gage is utilized in such a way that the contact member 15 is subjected to shock or to a blow the contact plunger will rise rapidly, for example, to the position shown in Figure 4. As an example of such shock, it may be stated that gages of this type are frequently utilized in the operation of axle straightening. In so straightening axles it is customary to measure the deviation from the original straight condition and to then strike the axle with a sledge hammer at the point of maximum deviation.

Prior to the development of the shockproof gage of this invention it was sometimes necessary to remove the gage from the axle which was being straightened before each blow was struck and to return it to measuring position when it was desired to take a new reading. When utilizing the gage of this invention it may be left in measuring position throughout the straightening operation since even such heavy blows as may be struck with a heavy sledge hammer do not damage the gage. Under shock circumstances such as explained above, the blow will not be transmitted to the gears because the pin 17 will move rapidly away from the end of the slot in the block 21 but the rack block 21 will follow this movement under the tension of the light spring 24 only and will thus move gradually into position where the end of the slot therein again makes contact with the pin 17.

Furthermore, the piston 30 operating in the bore 31 will damp the movement of the rack block and consequently it will move only slowly into position with the lower end of the slot therein against the pin 17 and thus cannot transmit shock to the gears.

As will readily be seen, the damping effect of the piston 30 operating in its cylinder 31 precludes any shock being transmitted to the gear train and renders the indicator completely shockproof and adaptable to use in such operations as axle straightening, as mentioned above.

While I have described a preferred embodiment of my invention, it will be understood that modifications thereof may be utilized within the scope and spirit of my invention. Consequently, I wish to be limited not by the foregoing description but, on the contrary, solely by the claims granted me.

What is claimed is:

1. In a shockproof dial indicator of the class described and having a rack block mounted on a contact plunger and movable with respect thereto under urge of a spring, means for rendering the indicator proof against shock and consequent damage to the gear train thereof comprising a block mounted in a fixed position, said block having a cylindrical bore therein and a piston fixed to said rack block and movable in said bore to thereby damp the action of the spring.

2. In a shockproof dial indicator of the class described and having a rack block mounted on a contact plunger and movable with respect thereto under urge of a spring, means for rendering the indicator proof against shock and consequent damage to the gear train thereof comprising a block mounted in a fixed position adjacent the rack block, a cylindrical bore in said block, a piston mounted for movement in said bore, and means connecting said piston to the rack block, whereby the piston acts as a damping device for the spring.

3. In a shockproof dial indicator of the class described and having a rack block mounted on a contact plunger and movable with respect thereto under urge of a spring, means for rendering the indicator proof against shock and consequent damage to the gear train thereof comprising a block mounted in a fixed position adjacent the rack block, a cylindrical bore in said block, a piston mounted for movement in said bore, a pin connecting said piston to the rack block whereby the piston acts as a damping device for the spring, said pin extending through a slot in the wall of said cylindrical bore.

EARL M. BOAT.

REFERENCES CITED

The following references are of record in the file of this patent:

UNITED STATES PATENTS

| Number | Name | Date |
|---|---|---|
| 1,300,210 | Cady | Apr. 8, 1919 |
| 2,178,745 | Emery | Nov. 7, 1939 |